W. A. HANSEN.
AUTOMOBILE TRANSPORTATION SUPPORT.
APPLICATION FILED DEC. 15, 1920.

1,390,530.

Patented Sept. 13, 1921.
2 SHEETS—SHEET 1.

William A. Hansen
Inventor
by J. M. Thomas
Attorney

W. A. HANSEN.
AUTOMOBILE TRANSPORTATION SUPPORT.
APPLICATION FILED DEC. 15, 1920.

1,390,530.

Patented Sept. 13, 1921.

2 SHEETS—SHEET 2.

Inventor
William A. Hansen
by J. M. Thomas
Attorney

UNITED STATES PATENT OFFICE.

WILLIAM A. HANSEN, OF SALT LAKE CITY, UTAH, ASSIGNOR OF ONE-SIXTH TO ROBERT F. ELVIN, ONE-SIXTH TO ALFRED LEFAVOR, ONE-SIXTH TO FINIS L. EWING, ONE-SIXTH TO MARSHAL M. DANIELS, AND ONE-SIXTH TO JOHN PERCY BOWERS, ALL OF SALT LAKE CITY, UTAH.

AUTOMOBILE-TRANSPORTATION SUPPORT.

1,390,530.    Specification of Letters Patent.    Patented Sept. 13, 1921.

Application filed December 15, 1920. Serial No. 430,965.

*To all whom it may concern:*

Be it known that I, WILLIAM A. HANSEN, a citizen of the United States, residing at Salt Lake City, in the county of Salt Lake and State of Utah, have invented certain new and useful Improvements in Automobile-Transportation Supports, of which the following is a specification.

My invention relates to devices for supporting automobiles in transit, and has for its object to provide means for supporting automobiles and securing them securely in place within a freight car whereby double the number of such machines may be transported more economically and with greater security than has been done.

These objects I accomplish with the device illustrated in the accompanying drawings, in which similar letters and numerals of reference indicate like parts throughout the several views, and as described in the specification forming a part of this application and pointed out in the appended claims.

Figure 1:
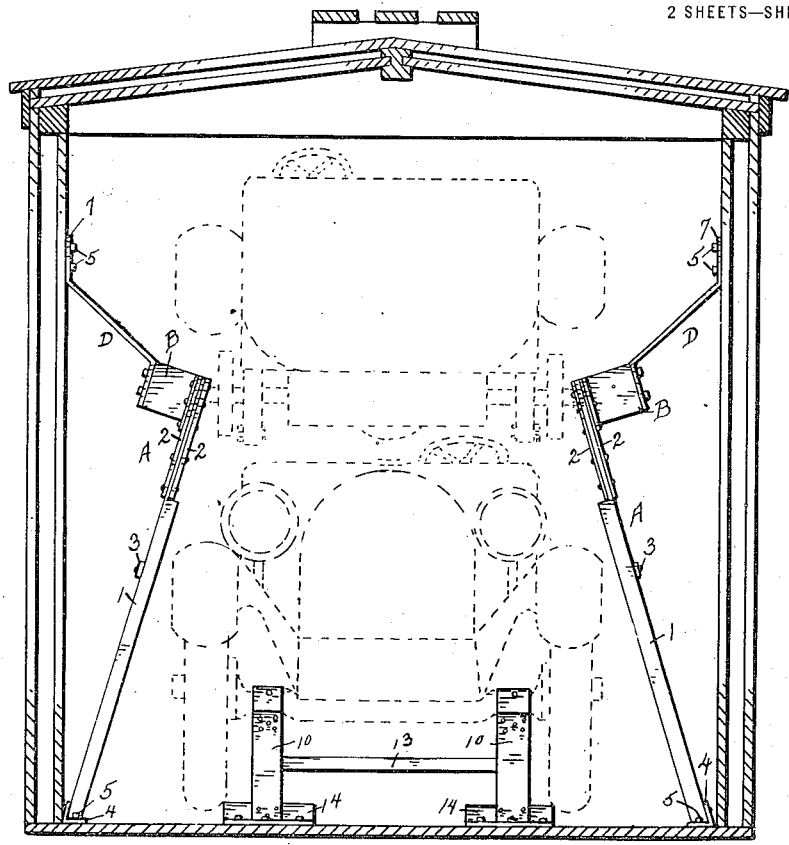
Figure 3:
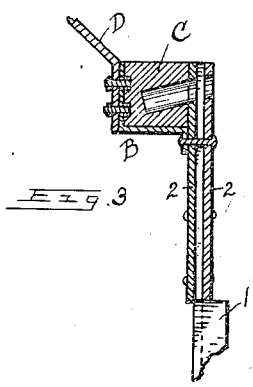
Figure 4:
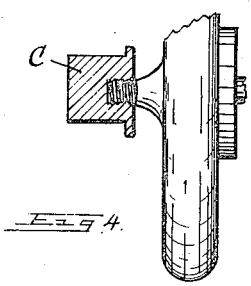
Figure 5:
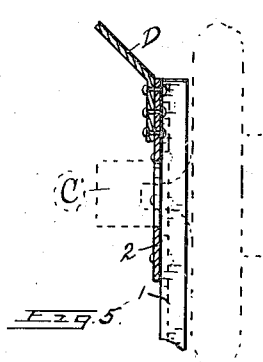
Figure 2:
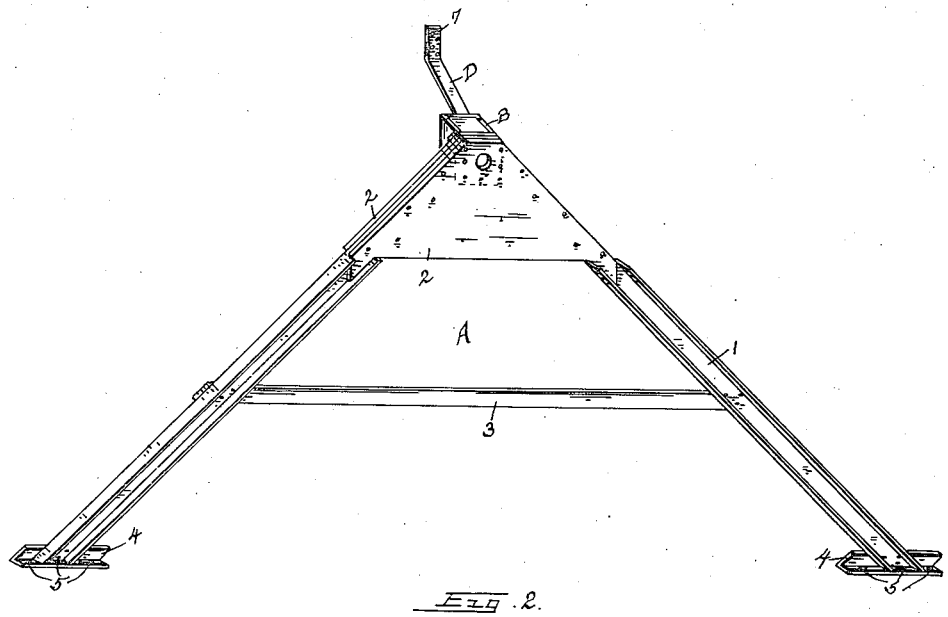
Figure 7:
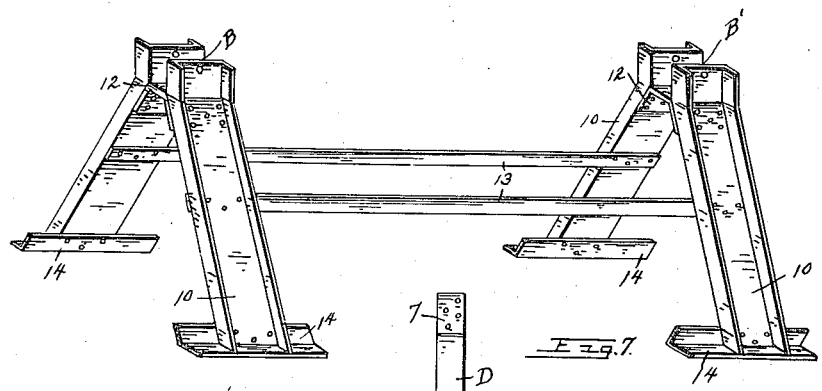
Figure 6:
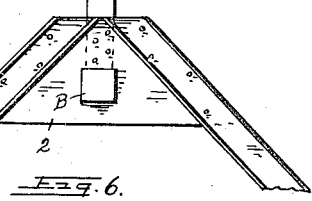
Figure 8:
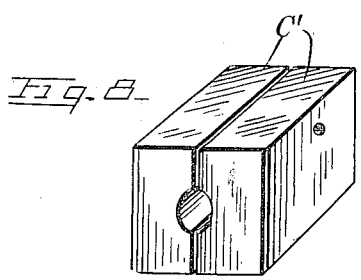

In the drawings, in which I have shown a substantial embodiment of my invention, Figure 1 is a transverse section of a box car with my invention shown in end elevation therein as used to secure and support two automobiles. Fig. 2 is a view in perspective of one of the supports, outwardly inclined. Fig. 3 is a longitudinal section of the axle holding portions of my invention. Fig. 4 is a section of the axle holding block as modified to receive the axle of another make of machines. Fig. 5 is a longitudinal section of the axle support shown in Fig. 4. Fig. 6 is a side elevation of the same support, parts cut away and looking at it from another position. Fig. 7 is a view in perspective of the support and fastener used by me to carry the lower automobile when in transit. Fig. 8 is a view in perspective of the modified form of axle block.

In shipping automobiles it is highly desirable to transport as many automobiles as may be loaded in a railway car, and some use a detachable deck or double deck on which the upper row of machines is carried while the lower row of machines is carried on the floor of the car, and I am aware that others have invented devices to support the upper row of automobiles without using the upper deck or double deck floor.

The present invention supplies new and novel automobile supports and holding means of simple and efficient construction whereby two rows of automobiles may be transported in railway cars, which supports may be removed from the cars and sent back to the automobile factory or other shipper for similar use, and consists of four supports A, one to be used on each end of each axle of the automobile. Each of said supports consists of two channel iron legs 1 which are set at an angle and meet at the top or apex, where they are rigidly fastened together by the triangular braces or metal sheets 2, two of which are used at each apex. They are also braced by the horizontal girder brace 3. Angle iron foot pieces 4 are fastened on the lower ends of said legs 1, which foot pieces are bored or perforated to receive lag screws 5, by which the supports are detachably fastened to the floor of the railway car. An open box or casing B, preferably square or rectangular in cross section is fastened to the upper end of said support A and within which box is carried the axle block C. A bracket brace D is secured to one side face of said box B and is bent at an incline toward the side of the railway car, with a foot portion shown at 7 which is perforated to have other lag screws 5 passed through said foot portion to fasten the device to the inside wall of the railway car. The said box B may be positioned slightly different and the axle block C changed slightly to accommodate and hold the end portions of the different makes of cars, and the axle block is to be bored to receive the different sized and shaped axle ends. The said block C may be made of any suitable material which will not injure the axle, such as wood, papier mâché, or cheap rubber.

I provide a modified form of my device for use under the front wheels of the automobiles which are carried on the floor of the railway car, as shown in Figs. 2 and 7, which consists of spacing the legs 10 of the support apart at both the top and bottom. The foot pieces 14 are secured on the lower end of the legs and are to be fastened by lag screws to the floor of the railway car. The upper ends of the legs 10 are spaced apart and held by the metal plate or brace 12, which, with the adjacent portions of the legs 10, form the axle block box B' which in this form has no ends but only bottom and sides. The axle block C' consisting of two sections having a groove in each to receive the axle, is held on the axle and within the axle block box B' by bolts passed through box B' and the block C', and preferably over the axle of the car after it has been placed in position. The girder braces 13 are fastened to the legs to hold them in spaced apart relation with each other.

As will be readily understood, the top row of automobiles is to be first put in place and supported, then the bottom or lower row of automobiles is put in place and the front axle of each is supported by the modified form of support shown in Fig. 7.

The use of my device is as follows:

An automobile is moved into a railway car and by any desired apparatus, such as blocks and tackle, the automobile is hoisted to the desired position in the upper part of said car, as shown in dotted lines in Fig. 1. While the automobile is thus suspended, if the axle has one form the wheels are removed and four of the supports are placed in position, with the end portions of the axles resting within the block C. The foot pieces are fastened in place with the lag screws 5 which are screwed into the floor of the car. The bracket braces D are fastened to the side wall of the railway car by similar lag screws through the perforation in the foot pieces 7. The hoisting apparatus may then be removed, as the automobile is thus firmly secured in position. When the balance of the upper row of automobiles are likewise fastened in place, the lower row may be set in place and the front portion of the machine raised by jacks or otherwise, as desired, and the modified form of my invention shown in Fig. 7 is used to fasten said portion of the automobile in place by inserting the axle block C' in the opening B', and fastening the support in place by lag screws through the foot pieces 14.

If an automobile having the form of axle known as the floating axle is to be transported, I use the form of block shown in Figs. 4 and 5, and in that use the wheels of the automobile need not be removed, but the hub cap only is removed and the block C is to be screwed on in place of the hub cap.

Having thus described my invention and its use, I desire to secure by Letters Patent and claim:

1. In an automobile transportation support, the combination of supporting legs, each consisting of two channel irons set at an incline toward each other and rigidly fastened by two triangular sheets of metal at the apex; a horizontal girder brace; a block receiving box secured to the channel iron legs by fastening it to one of said triangular braces; a bracket brace fastened to said box and extending upwardly and at an incline from said box; and foot pieces of angle iron fastened to said bracket brace and one at the lower end of each channel iron leg, and each of said foot pieces perforated to receive lag screws by which the device is detachably secured to a railway car.

2. An automobile support for use in shipping, comprising upwardly converging channel irons; triangular metal sheets to fasten said channel irons together at the apex; a hollow metal box secured to one of said triangular sheets; a bracket brace fastened to said box and extending upward at an incline from said box; and a block to be carried in said box and recessed to receive the end portions of an automobile axle.

In testimony whereof I have affixed my signature.

WM. A. HANSEN.